(12) United States Patent
Stenfelt et al.

(10) Patent No.: US 9,930,599 B2
(45) Date of Patent: Mar. 27, 2018

(54) METHOD AND APPARATUSES FOR MOVING A SERVICE OR IP SESSION FROM FIRST TO SECOND ACCESS

(75) Inventors: John Stenfelt, Gothenburg (SE); Dirk Kopplin, Ytterby (SE); Stefan Rommer, Vastra Frolunda (SE); Hans Bertil Ronneke, Kungsbacka (SE)

(73) Assignee: TELEFONAKTIEBOLAGET LM ERICSSON (PUBL), Stockholm (SE)

( * ) Notice: Subject to any disclaimer, the term of this patent is extended or adjusted under 35 U.S.C. 154(b) by 0 days.

(21) Appl. No.: 13/379,425

(22) PCT Filed: Jun. 30, 2009

(86) PCT No.: PCT/EP2009/058196
§ 371 (c)(1),
(2), (4) Date: Dec. 20, 2011

(87) PCT Pub. No.: WO2011/000414
PCT Pub. Date: Jan. 6, 2011

(65) Prior Publication Data
US 2012/0093169 A1 Apr. 19, 2012

(51) Int. Cl.
*H04L 29/06* (2006.01)
*H04W 36/30* (2009.01)
(Continued)

(52) U.S. Cl.
CPC ............ *H04W 36/30* (2013.01); *H04W 28/16* (2013.01); *H04W 80/04* (2013.01); *H04W 80/06* (2013.01)

(58) Field of Classification Search
CPC . H04W 40/00; H04W 36/14; H04W 36/0016; H04W 36/0033; H04W 92/24; H04L 45/00
(Continued)

(56) References Cited

U.S. PATENT DOCUMENTS 6,574,216 B1 * 6/2003 Farris ................. H04L 41/5009
370/237
7,831,252 B2 * 11/2010 Shang ................. H04W 36/30
370/331
(Continued)

FOREIGN PATENT DOCUMENTS

EP 0980168 A2 2/2000
EP 0980168 A3 6/2004

OTHER PUBLICATIONS

Office Action dated Jun. 20, 2014, issued in Chinese Patent Application No. 200980160307.5, 7 pages.
(Continued)

*Primary Examiner* — Andrew Chriss
*Assistant Examiner* — Rasha Fayed
(74) *Attorney, Agent, or Firm* — Rothwell, Figg, Ernst & Manbeck, P.C.

(57) ABSTRACT

The present invention relates to a method for moving at least one service or an IP session from a first access to a second access, comprising the following steps: —a Gateway, GW, routes (25) a data packet flow between a Packet Data Network, PDN, and a User Equipment, UE, for said service or IP session over the first access, —the GW monitors (26) the data packet flow between the PDN and the UE to detect the network performance of the first access, —the GW— moves (27) the routing of the data packet flow to the second access when the network performance goes below a threshold.

10 Claims, 3 Drawing Sheets

(51) Int. Cl.
 *H04W 28/16* (2009.01)
 *H04W 80/04* (2009.01)
 *H04W 80/06* (2009.01)
(58) Field of Classification Search
 USPC ........................................................ 370/401
 See application file for complete search history.

(56) References Cited

U.S. PATENT DOCUMENTS

| | | | | |
|---|---|---|---|---|
| 2006/0111112 A1* | 5/2006 | Maveddat | ............... | H04W 8/02 455/439 |
| 2006/0159047 A1 | 7/2006 | Olvera-Hernandez et al. | | |
| 2006/0268708 A1* | 11/2006 | Speight | .................. | H04L 47/10 370/235 |
| 2007/0058645 A1* | 3/2007 | Nannra | ................. | H04L 41/046 370/401 |
| 2007/0156804 A1 | 7/2007 | Mo | | |
| 2007/0242681 A1* | 10/2007 | Kono | ..................... | H04L 47/10 370/401 |
| 2008/0085712 A1* | 4/2008 | Han | ..................... | H04W 36/04 455/440 |
| 2008/0137541 A1* | 6/2008 | Agarwal | ................ | H04W 4/02 370/241 |
| 2008/0192638 A1* | 8/2008 | Massiera | .............. | H04W 36/30 370/237 |
| 2009/0073936 A1* | 3/2009 | Jentz | ................ | H04W 36/0022 370/331 |
| 2009/0080382 A1* | 3/2009 | Chen | ................. | H04W 36/0016 370/331 |
| 2009/0201878 A1* | 8/2009 | Kotecha | .................. | H04L 45/00 370/331 |
| 2010/0046370 A1* | 2/2010 | Ghose | .................. | H04L 1/1809 370/235 |
| 2010/0154031 A1* | 6/2010 | Montemurro | ........... | H04L 63/20 726/1 |
| 2010/0284299 A1* | 11/2010 | Bi | ........................ | H04W 48/16 370/253 |
| 2011/0013590 A1* | 1/2011 | Chi | ....................... | H04W 36/14 370/331 |

OTHER PUBLICATIONS

"3rd Generation Partnership Project; Technical Specification Group Services and System Aspects; Architecture enhancements for non-3GPP accesses (Release 9)," 3rd Generation Partnership Project (3GPP), 3GPP Standard; 3GPP TS 23.402, V9.1.0, Jun. 10, 2009, pp. 1-195, XP050363665.
Second Office Action dated Mar. 10, 2015, issued in Chinese Patent Application No. 200980160307.5, 16 pages.
Third Office Action dated Sep. 24, 2015, issued in Chinese Patent Application No. 200980160307.5, 6 pages.
Office Action issued in corresponding European Application No. 09780034.6 dated Feb. 16, 2017, 4 pages.

* cited by examiner

METHOD AND APPARATUSES FOR MOVING A SERVICE OR IP SESSION FROM FIRST TO SECOND ACCESS

CROSS REFERENCE TO RELATED APPLICATION(S)

This application is a 35 U.S.C. § 371 National Phase Entry Application from PCT/EP2009/058196 filed Jun. 30, 2009, designating the United States, the disclosure of which is incorporated herein in its entirety by reference.

TECHNICAL FIELD

The present invention relates to a method for moving at least one service or an IP session from a first access to a second access. It also relates to a Gateway and a Policy Control Function, PCF, adapted for the same purpose.

BACKGROUND

Terminals (User Equipments/Mobile Stations) are often equipped with capabilities for access via 2G/3G and WLAN. Other equipments, such as a laptop, may have capabilities for access via HSPA (High Speed Packet Access)/LTE (Long Term Evolution), WLAN (Wireless LAN) and Ethernet. Typically the terminal or laptop uses different accesses one at a time. And more importantly, a given service or a given IP session is only using one access at a time.

Currently 3GPP EPS (Evolved Packet System), also known as 3GPP SAE, is defining solutions for how session continuity can be achieved when a UE moves between different accesses. This can e.g. mean that a service that is running over a cellular access is moved to run over a WLAN access instead. But also with this solution, the UE is only using one access at a time and during an access change, the whole IP session and all running services within that IP session is moved from source access to target access.

Simultaneous use of multiple accesses (a.k.a. multihoming) is not supported, except for very short times during a handover between two accesses. Multihoming is a term used for techniques intended to increase the reliability of the internet connection for an IP network. Now the scenario where a terminal (UE/MS) can get simultaneous access over a variety of access networks is gaining more interest.

There is work ongoing in IETF (Internet Engineering Task Force) for defining mobility solutions in multihoming scenarios. Related work has also been started up in 3GPP. As part of this work the concept of "flow mobility" is investigated. This means that i.e. only a subset of the IP flows for a given IP session is moved from one access to another. For example, it could be that only the video component of a multimedia call is moved from cellular access to WLAN, while the IP flows related to the voice component of the same call stays in cellular access. Some services, e.g. telephony or audio/video streaming require resources to be reserved in the target access in order to provide acceptable quality of experience to the end user(s).

However, it is difficult to predict availability of resources in mobile networks where congestions and bandwidth variations can occur at any point in time. QoS (Quality of Service) mechanisms have been developed to address the needs that services sensitive to bandwidth variations and delay have. However, once QoS mechanisms come into play some subscriber's will be favored over others. This may result in a decreased level of perception for some subscribers, while others will not experience any changes.

The problem is therefore that the current network solutions (such as QoS) are very terminal centric and does not take full advantage of the existing network architecture.

SUMMARY OF THE INVENTION

The object of the present invention is therefore to keep operators in control of service delivery over multiple accesses and at the same time secure that subscribers are not affected by bandwidth or delay variations.

The object is solved by means of a method for moving at least one service or an IP session from a first access to a second access. The method comprises the following steps:
  a Gateway, GW, routes a data packet flow between a Packet Data Network, PDN, and a User Equipment, UE, for said service or IP session over the first access,
  the GW monitors the data packet flow between the PDN and the UE to detect the network performance of the first access,
  the GW moves the routing of the data packet flow to the second access when the network performance goes below a threshold.

The object is also solved by means of a Gateway, GW, being adapted for moving at least one service or an IP session from a first access to a second access. The GW is particularly characterized in that
  the GW is adapted to route a data packet flow between a Packet Data Network, PDN, and a User Equipment, UE, for said service or IP session over the first access,
  the GW is further adapted to monitor the data packet flow between the PDN and the UE to detect the network performance of the first access,
  the GW is further adapted to move the routing of the data packet flow to the second access when the network performance goes below a threshold.

The object is finally solved by means of a Policy Control Function, PCF, being adapted to instruct the GW to move the routing of the data packet flow to the second access when being informed by a Policy Enforcement Function, PEF, that the network performance is detected to go below the threshold.

The main advantage with the invention is that functionality to detect changes in network performance, which can occur at any point in time, can be centralized and coupled with service knowledge. There is no requirement to collect information on network performance from more than one location in the network.

Knowledge of network performance is linked with service knowledge, which is built on existing PCC (Policy and Charge Control) functionality. By coupling both sources of information together, the network can quickly respond to bandwidth constrains and secure that services perform well. The use of RTT (Round Trip Time) and packet re-transmissions (two simple operations) as input data for decisions has low impact on CPU load. The measurements can thereby done with minimum impact on node performance.

By locating the set of functions at one spot in the network result in that signaling load can be reduced to a minimum. If, in addition, alternative access are pre-established switch-over times can be decreased to a minimum. The service can thereby perform well and end user perception is not affected.

Further advantages are achieved by implementing one or several of the features of the dependent claims. This will be further explained below.

BRIEF DESCRIPTION OF THE DRAWINGS

The invention will be described in greater detail in the following, with reference to the examples that are shown in the attached drawings, in which.

DETAILED DESCRIPTION

The embodiments of the invention with further developments described in the following are to be regarded only as examples and are in no way to limit the scope of the protection provided by the patent claims.

The present invention relates to a method for moving at least one service or an IP session from a first access to a second access. It also relates to a Gateway and a Policy Control Function, PCF, adapted for the same purpose. Even though the detailed description describes the method performed by these functions, the person skilled in the art realizes that these functions, which are adapted to perform these method steps, are also disclosed in the description.

Figure 1:
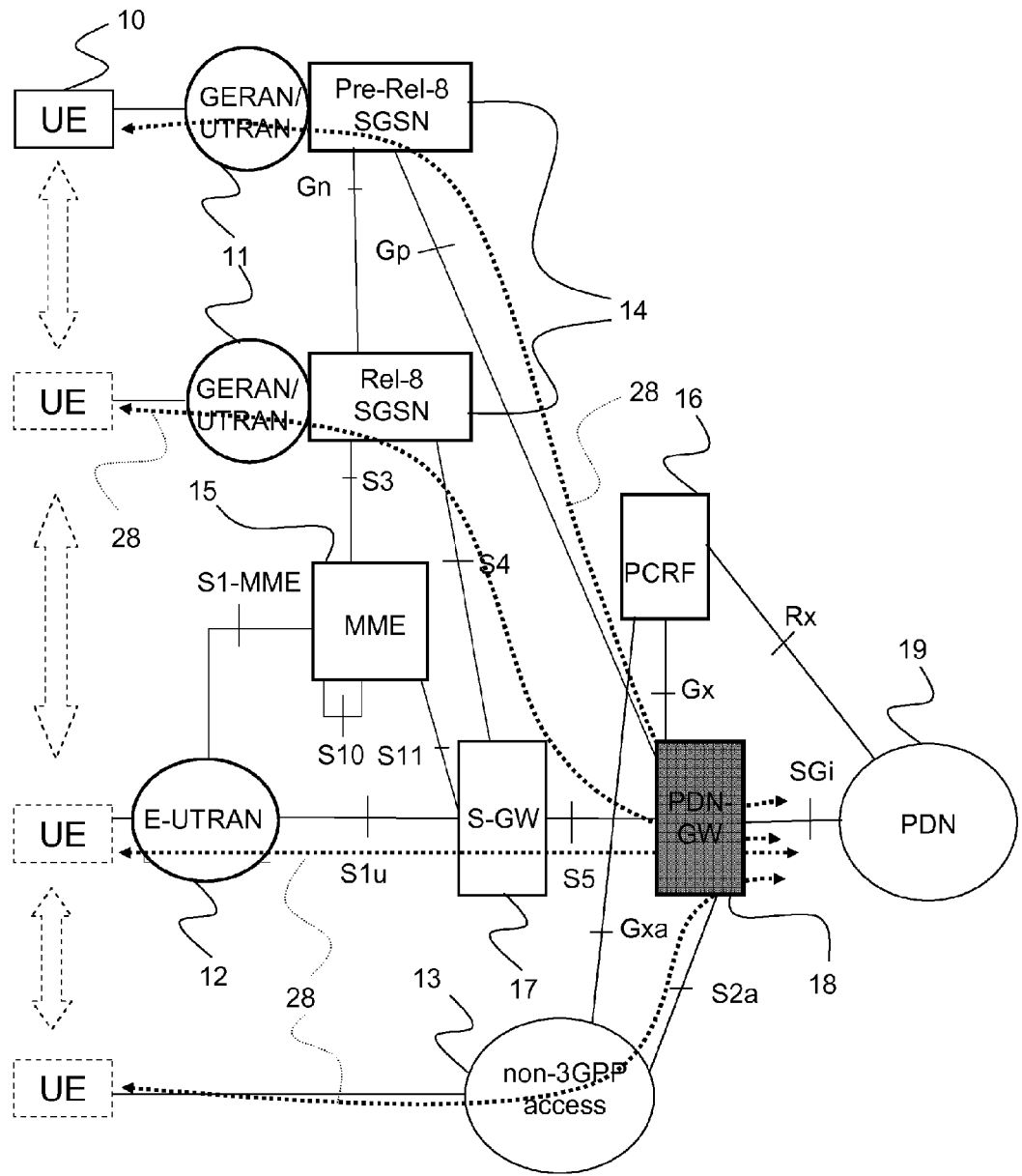
FIG. 1 illustrates schematically a network signaling diagram.

FIG. 1 shows a network into which the present invention is preferably implemented. FIG. 1 shows a System Architecture Evolution (SAE) core network. Components of the network communicate with each other via reference points and interfaces (Gn, Gp, S3, S4, S10, S11, S1u, S5, Gxa, Gx, Rx, S2a, SGi), which will not be described more in detail here. Some components of the SAE core network are a Mobility Management Entity (MME) 15, a Serving Gateway (S-GW) 17 and a Gateway, GW, which in the following will be exemplified by a Packet Data Network Gateway (PDN-GW) 18.

The MME 15 is responsible for controlling an E-UTRAN Radio Access Network (RAN) 12, and selecting S-GW 17 for a User Equipment, UE, 10. From now on all RAN's will be named "access". MME also provides the control plane function for mobility between the E-UTRAN access and GERAN/UTRAN accesses 11, which are divided into pre-rel-8 and rel-8 GERAN/UTRAN. The S-GW routes and forwards data packet flows 28 for particular services. It also acts as mobility anchor for mobility between the E-UTRAN and GERAN/UTRAN. The Serving GPRS Support Node (SGSN) 14 is in GPRS core networks for instance responsible for routing and forwarding data packet flow 28 from and to the UE. It is in SAE connected to MME and the S-GW.

The PDN-GW 18 provides connectivity between the UE 10 and external Packet Data Networks (PDN) 19 by being the point of exit and entry of traffic for the UE. An UE may have simultaneous connectivity with more than one PDN-GW 18 for accessing multiple PDN's. A key role of the PDN-GW is to act as the anchor for mobility between 3GPP and non-3GPP technologies such as WiMAX and 3GPP2. Non-3GPP technologies are in the following also embraced by the term "access".

Figure 2:
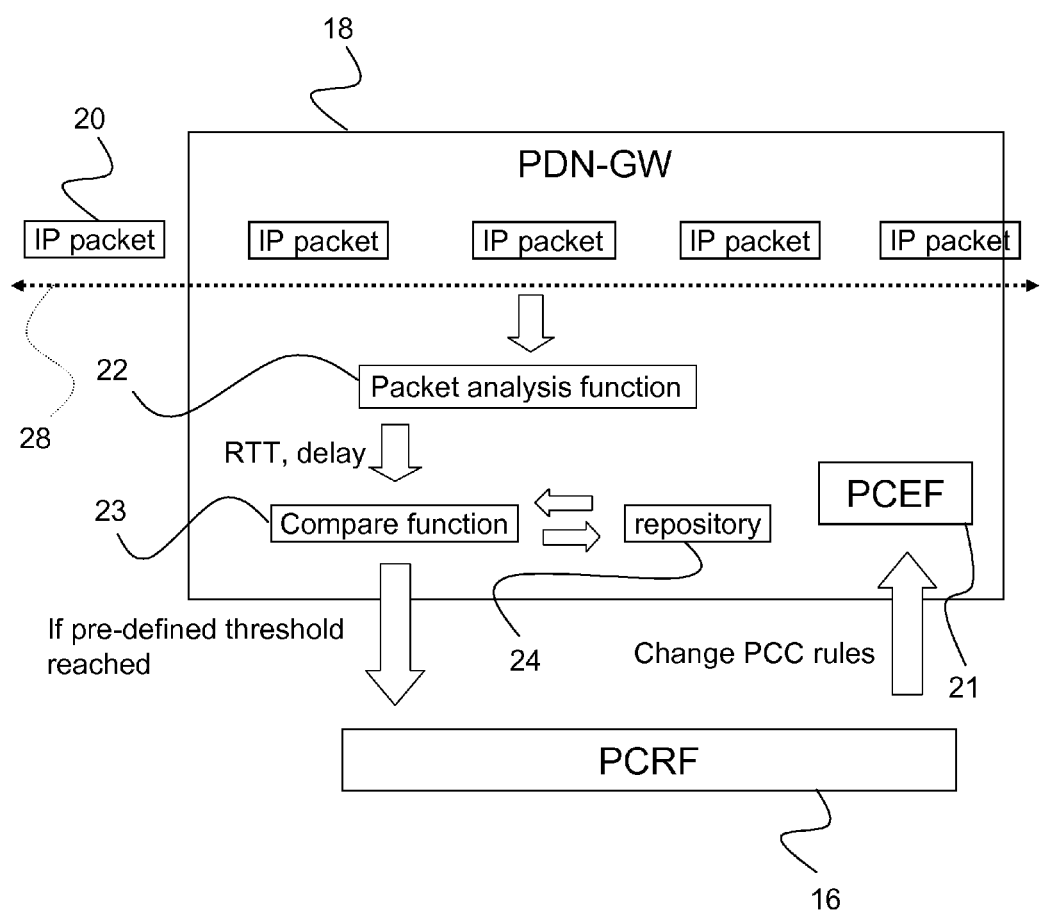
FIG. 2 illustrates functional building blocks according to the present invention

The PDN-GW 18 comprises a Policy Enforcement Function, PEF, 21 (see FIG. 2). PEF will in the following be exemplified by a Policy and Charging Enforcement Function, PCEF. PCEF encompasses policy enforcement and data packet flow based charging functionalities in the PDN-GW. It provides control over the user plane traffic handling at the PDN-GW and its Quality of Service. It also provides service data flow detection and counting. PCEF only allows service data flow to pass the PDN-GW when there is an active PCC (Policy and Charging Control) rule.

A Policy Control Function, in the following exemplified by a Policy Control and Charging Rules Function 16, PCRF, controls the PCEF by providing PCC rules via the Gx reference point. The PCC rules decision in the PCRF may be based on information obtained by the PCEF via the Gx reference point. The PCRF can by changing the PCC rules control the accesses on a PDP context basis, see FIG. 1, for the UE. This will be described more in detail in the following.

Bandwidth variations in wireless networks may lead to packet drop and further could affect service perception. When one access becomes overloaded, while at the same time an available alternative access may have the needed resources, a mechanism is needed to dynamically move services or IP sessions to the most favourable access.

In order to enable such a movement, the present invention comprises certain steps that are performed for moving at least one service or an IP session from a first access to a second access. A service is for instance telephony or audio/video streaming between the UE 10 and the PDN 19.

Figure 3:
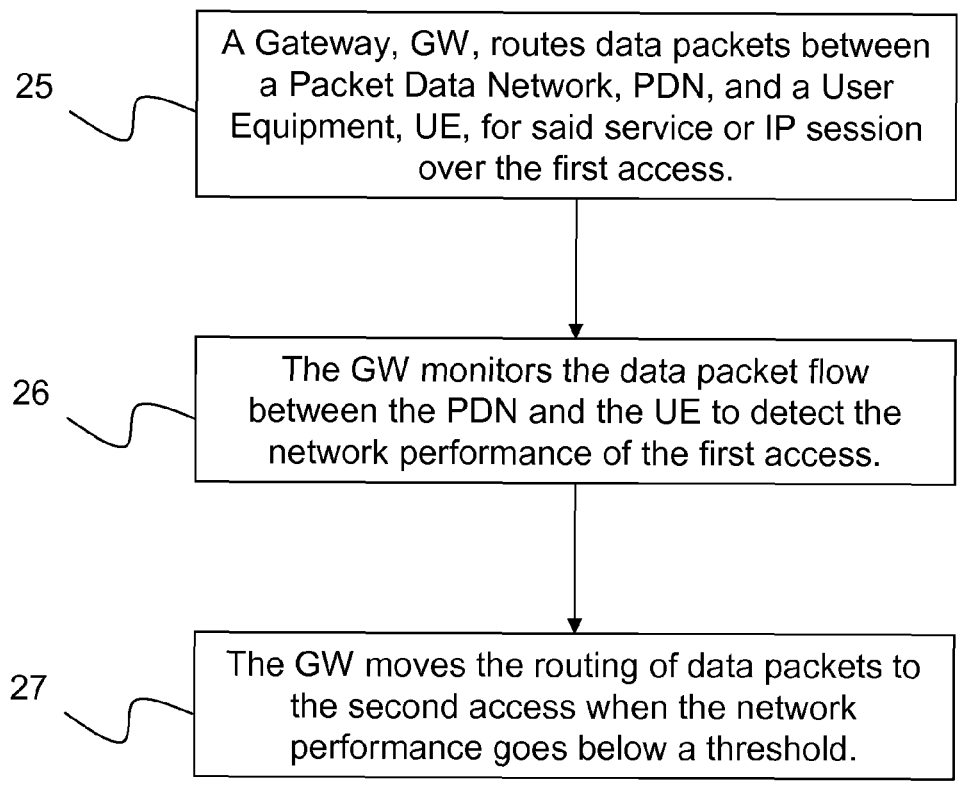
FIG. 3 illustrates a flow scheme for the method according to the present invention.

The present invention comprises the following steps, see FIGS. 1-3:
1. The PDN-GW 18 routes 25 a data packet flow 20 between the PDN 19 and the UE 10 for said service or IP session over a first access 11,12,13.
2. The PDN-GW 18 monitors 26 the data packet flow 20 between the PDN 19 and the UE 10 to detect the network performance of the first access 11,12,13.
3. The PDN-GW moves 27 the routing of the data packets flow 20 to a second access 11,12,13 when the network performance goes below a threshold.

With the present invention, it is enabled to choose an access 11, 12 13, which is best suited for a particular service or the IP session and thereby compensate for the bandwidth variations on a certain access. With the proposed method, the operators are kept in control of service delivery (network based solution) and at the same time it is secured that subscribers are not affected by bandwidth or delay variations. It gives the operator a tool allowing service delivery in a fashion the subscriber expects.

With the monitoring 26 of the data packet flow 28, bandwidth constrains are identified in the network. Bandwidth constrains can lead to packet drop or extensive packet delay. By analyzing network performance the network becomes aware of end-to-end constrains. While linking knowledge of network performance with service awareness the network can take decisions, which access to choose for best service delivery.

In the present invention, the first and second accesses are GERAN/UTRAN 11 (pre-rel-8 or rel-8 access), E-UTRAN 12 and/or a non-3GPP access 13. The present invention enables the service to be moved between at least two accesses. The first and second accesses can be of the same or different access technologies. For instance, the first access is GERAN/UTRAN 11 and the second access is a non-3GPP access 13. As an alternative, the first access may be E-UTRAN 12 and the second access a different E-UTRAN access. The person skilled in the art realizes that the first and second access can be of any suitable technology.

The first access 11,12,13 consist in a most preferred choice, while the second access 11,12,13 consists in an alternative access. Before step 1 is performed, the UE 10 may initially be connected to the PDN 19 over both the first and second access. An access may thereby be established over the second access prior to the movement of the routing of the data packet flow 28. In order to establish the connection to the second access, the PDN-GW 18 may trigger bearer procedures. The connection to the second access is in stand by mode unless wake up. The advantage with preparing the second access beforehand is that switch-over time can be reduced.

The respective access comprises respective Packet Data Network bearers, which enables the packet data flow 28 between the UE 10 and the PDN 19. The bearers may be default bearers which are setup by the UE and/or dedicated bearers which are setup by the PCEF or the GW.

The data packet flow 28 preferably consists in a Transmission Control Protocol, TCP, flow, since monitoring is most suitable in TCP. In order to monitor congestions in the network performance in the network, the data packet flow 28 performance needs to be analyzed. In order to enable the analysis, the PCEF 21 in the PDN-GW 19 may perform packet header inspection on routed packets 20 in the data packet flow 28 to identify a packet. The monitoring and analysis is preferably performed by a Deep Packet Inspection, DPI, functionality in the PCEF.

Network performance may be identified by measuring the data packet flow 28 round trip time (RTT). This means that the data packet flow 28 is monitored by the DPI by measuring the RTT between when a data packet 20 in the data packet flow 28 is forwarded to the UE 10 and when an acknowledgement packet is received from the UE 10. The data packets 20 are forwarded by the PDN-GW 18 and the acknowledgement packets are received by the PDN-GW.

Changes of round-trip-times can occur if packets 20 need to be buffered for example in a RAN due to resource shortage. If packets are being buffered it leads to longer round trip times, thus lack of transmission resources can be assumed. If round trip time decreases packets are less buffered. This can be read as forwarding resources are available. By analyzing the measurements, estimations can be done on how good network performance is at a defined point in time or over a period of time.

Network performance can in combination with RTT or as an alternative be identified by monitoring the data packet flow 28 by measuring re-transmissions of data packets 20 in the data packet flow to the UE 10. Re-transmissions of TCP packet 20 can occur if for example coverage becomes an issue. While monitoring data packet flow characteristics the network can make assumptions and take decisions to choose another access 11,12,13 where it is more likely that services perform well.

By analyzing the measurements and compare changes in the wireless network, i.e. access performance can be estimated. When the DPI has identified the network performance, the results from the identification is forwarded to a compare function 23, see FIG. 2. In the compare function the monitored data packet flow is compared with previously monitored packet data flow 28 values to detect variations in the network performance. The previously monitored flow values are stored in a repository 24. The compare function may be located either in the PDN-GW 18 or in the PCRF 16.

If the network performance is detected to go below the threshold, the PCRF 16 is informed. The PCRF then instructs the PDN-GW 18 to move the routing of the data packet flow 28 to the second (alternative) access. This means that for instance if the network variations of RTT becomes too large and pass the pre-defined threshold, the compare function 23 indicates to the PCRF that network performance, i.e. access transmission capabilities, have exceeded the lowest acceptable limit. Similar if the DPI indicates re-transmission of IP packets and the number of re-transmissions passes a pre-defined threshold, the compare function indicates this to the policy control function.

If dynamic PCC is deployed in the PDN-GW 18, the PDN-GW needs to inform the PCRF of resource constrains. If the action then is to move the service to the alternative access it instructs the PCEF 21 to start switch over procedures and to activate the alternative access. The PCRF 16 decides based on the received network performance information and configured PCC rules, which action to take.

The PDN-GW 18 installs PCC rules towards the second access when being instructed (by the PCRF) to move the routing of the data packet flow 28. Once the PDN-GW has performed switch-over to the alternative access the PCRF is informed of the success.

In summary, the present invention provides the advantage that it uses a simple architecture, built on existing PCC. It further reduces the signaling load (congestions can be detected remotely) and selects new accesses fast (low switchover time to new access). Other advantages are that service reliability is secured when bandwidth constrains become an issue. It provides a quick reaction on dynamic changes to available bandwidth and provides a network based solution (keeps operator in control). Finally, with the invention there is no need to rely solely on terminal support and a centralized network performance monitoring is provided.

The invention is not to be regarded as being limited to the examples described above. A number of additional variants and modifications are possible within the scope of the subsequent patent claims. The invention can be deployed in any network where an alternative path is available. Further, for access networks with limited QoS functionality, e.g. WLAN, or little integration between the access and service aware part of the network, it offers a way to take actions if network performance drops and services becomes affected.

The invention claimed is:

1. A method, performed by a packet data network gateway (PDN-GW), for moving at least one IP session from a first access to a second access, the method comprising the following steps:
   routing, by the PDN-GW, a data packet flow between a packet data network (PDN) and a user equipment (UE) for said at least one IP session over the first access, wherein the data packet flow uses transmission control protocol (TCP) flow;
   performing, by the PDN-GW, packet header inspection on routed packets in the data packet flow to identify a packet, wherein said packet header inspection includes deep packet inspection (DPI) functionality;
   monitoring, by the PDN-GW, the data packet flow for said at least one IP session between the PDN and the UE to detect a network performance of the data packet flow of the first access;
   storing, by the PDN-GW, said network performance in a data store;
   comparing by the PDN-GW, said network performance to previously monitored packet data flow values to detect variations in the network performance;
   identifying, by the PDN-GW, bandwidth constraints based at least in part on analyzing said monitoring;
   triggering, by the PDN-GW, bearer procedures to establish connection to the second access;
   determining, by the PDN-GW, that the network performance of the data packet flow of the first access is below a threshold;
   determining, by the PDN-GW, to move the routing of the data packet flow to the second access based at least on the results of the (i) determining, by the PDN-GW, that the network performance is below the threshold, (ii)

identifying, by the PDN-GW, bandwidth constraints based at least in part on analyzing said monitoring; and (iii) comparing, by the PDN-GW, said network performance to previously monitored packet data flows to detect variations in the network performance, and moving, by the PDN-GW, after said triggering, the routing of the data packet flow to the second access in response to determining, by the PDN-GW, to move the routing of the data packet flow to the second access.

2. The method according to claim 1, wherein the step of monitoring the data packet flow comprises measuring a round trip time between when a data packet in the data packet flow is forwarded to the UE and when an acknowledgement packet is received from the UE.

3. The method according to claim 1, wherein the step of monitoring the data packet flow comprises measuring re-transmissions of data packets in the data packet flow.

4. The method according to claim 1, wherein the first access is the most preferred choice of access.

5. The method according to claim 1, wherein if the network performance is detected to go below the threshold a policy control function (PCF) is informed, wherein the PCF instructs the PDN-GW to move the routing of the data packet flow to the second access.

6. The method according to claim 5, wherein the PDN-GW installs PCC rules towards the second access when being instructed to move the routing of the data packet flow.

7. The method according to claim 1, wherein a policy enforcement function (PEF) in the PDN-GW monitors the data packet flow.

8. A packet data network gateway (PDN-GW) being adapted for moving at least one IP session from a first access to a second access, the PDN-GW comprising:

a receiver;

a transmitter;

a data storage system; and a data processing apparatus comprising a processor, wherein the data processing apparatus is coupled to the data storage system, the transmitter, and the receiver, and the data processing apparatus is configured to:

route a data packet flow between a packet data network (PDN) and a user equipment (UE) for said at least one IP session over the first access, wherein the data packet flow uses transmission control protocol (TCP) flow, perform packet header inspection on routed packets in the data packet flow to identify a packet, wherein said packet header inspection includes deep packet inspection (DPI) functionality;

monitor the data packet flow for said at least one IP session between the PDN and the UE to detect a network performance of the data packet flow of the first access, store said network performance in a data store;

compare said network performance to previously monitored packet data flow values to detect variations in the network performance;

identify bandwidth constraints based at least in part on analyzing said monitoring, trigger bearer procedures to establish connection to the second access;

determine that the network performance of the data packet flow of the first access is below a threshold;

determine to move the routing of the data packet flow to the second access based at least on the results of the (i) determining, by the PDN-GW, that the network performance is below the threshold; (ii) identifying, b the PDN-GW, bandwidth constraints based at least in part on analyzing said monitoring; and (iii) comparing, by the PDN-GW, said network performance to previously monitored packet data flows to detect variations in the network performance; and move, after said triggering, the routing of the data packet flow to the second access in response to the PDN-GW determining to move the routing of the data packet flow to the second access.

9. The PDN-GW according to claim 8, wherein a policy enforcement function (PEF) in the PDN-GW is adapted to monitor the data packet flow.

10. The PDN-GW according to claim 8, wherein the data processing apparatus is configured to be instructed by a policy control function (PCF) to move the routing of the data packet flow to the second access when the PCF is informed by a policy enforcement function (PEF) that the network performance is detected to go below the threshold.

* * * * *